(12) United States Patent
Ito

(10) Patent No.: US 7,750,937 B2
(45) Date of Patent: Jul. 6, 2010

(54) SURVEILLANCE CAMERA SYSTEM

(75) Inventor: Tomokazu Ito, Toyoake (JP)

(73) Assignee: Elmo Co., Ltd., Aichi (JP)

( * ) Notice: Subject to any disclaimer, the term of this patent is extended or adjusted under 35 U.S.C. 154(b) by 1371 days.

(21) Appl. No.: 11/198,375

(22) Filed: Aug. 4, 2005

(65) Prior Publication Data

US 2006/0055778 A1   Mar. 16, 2006

(30) Foreign Application Priority Data

Sep. 15, 2004   (JP) .............................. 2004-268362

(51) Int. Cl.
*H04N 7/18* (2006.01)

(52) U.S. Cl. ............... 348/143; 348/208.3; 348/208.99; 348/151; 348/152

(58) Field of Classification Search ................. 348/143, 348/208.3, 208.99, 151, 152
See application file for complete search history.

(56) References Cited

U.S. PATENT DOCUMENTS 5,963,250 A * 10/1999 Parker et al. ............. 348/211.6

6,867,798 B1 * 3/2005 Wada et al. .................. 348/143

FOREIGN PATENT DOCUMENTS

| JP | H4-326258 | 11/1992 |
| JP | 2001-24916 | 1/2001 |

* cited by examiner

*Primary Examiner*—Shawn An
(74) *Attorney, Agent, or Firm*—William L. Androlia; H. Henry Koda

(57) ABSTRACT

A surveillance camera system is disclosed in which an image obtained by a surveillance camera controlled to be panned/tilted is displayed on a monitor. The system includes a tilt angle detector which detects a tilt angle of the surveillance camera, an inversion tilt angle storage which stores data of a plurality of the predetermined inversion tilt angles, an inversion tilt angle setting unit which selects and sets either or any one of the inversion tilt angles stored on the inversion tilt angle storage, a tilt angle comparing unit which compares the tilt angle detected by the tilt angle detector with the inversion tilt angle set by the inversion tilt angle setting unit, and an image inversion processing unit which carries out a process of inverting the image obtained by the surveillance camera upside down and symmetrizing the image bilaterally when the tilt angle is equal to or larger than the inversion tilt angle as a result of comparison by the tilt angle comparing unit.

1 Claim, 2 Drawing Sheets

SURVEILLANCE CAMERA SYSTEM

BACKGROUND OF THE INVENTION

1. Field of the Invention

This invention relates to surveillance camera systems.

2. Description of the Related Art

There have conventionally been provided surveillance cameras controlled to be panned/tilted. The surveillance cameras can be rotated 360 degrees when panned, whereas the surveillance cameras can be rotated in a range from 0 to 180 degrees when tilted. An image obtained by the surveillance camera is inverted upside down and symmetrized bilaterally when a tilt angle becomes equal to or larger than 90 degrees. Accordingly, when the tilt angle is increased from a horizontal position of the surveillance camera to 135 degrees, for example, a manner of reading data of image stored on a memory is changed so that a non-inverted image is displayed on the monitor.

However, the tilt angle at which the obtained image is inverted is set in consideration that the surveillance camera is installed on a horizontal installation surface such as a ceiling. Accordingly, in a case where an installation surface of the surveillance camera is inclined but not horizontal, an image displayed on the monitor is inverted and symmetrized when should not be inverted and symmetrized, or the image displayed on the monitor is not inverted and symmetrized when should be inverted and symmetrized.

SUMMARY OF THE INVENTION

Therefore, an object of the present invention is to provide a surveillance camera system which can overcome the above-noted problem and which can set the tilt angle when the obtained image is inverted according to an inclination of the installation surface of the surveillance camera.

The present invention provides a surveillance camera system in which an image obtained by a surveillance camera controlled to be panned/tilted is displayed on a monitor and inverted upside down and symmetrized bilaterally when a tilt angle is equal to or larger than a predetermined inversion tilt angle relative to a reference position. The system comprises a tilt angle detector which detects a tilt angle of the surveillance camera, an inversion tilt angle storage which stores data of a plurality of the predetermined inversion tilt angles, an inversion tilt angle setting unit which selects and sets either or any one of the inversion tilt angles stored on the inversion tilt angle storage, a tilt angle comparing unit which compares the tilt angle detected by the tilt angle detector with the inversion tilt angle set by the inversion tilt angle setting unit, and an image inversion processing unit which carries out a process of inverting the image obtained by the surveillance camera upside down and symmetrizing the image bilaterally when the tilt angle is equal to or larger than the inversion tilt angle as a result of comparison by the tilt angle comparing unit.

A tilt angle is detected by the tilt angle detector. Either or any one of the inversion tilt angles stored on the inversion tilt angle storage is selected and set by the inversion tilt angle setting unit. The detected tilt angle is compared with the set inversion tilt angle. When the tilt angle is equal to or larger than the inversion tilt angle, the image obtained by the surveillance camera is inverted upside down and symmetrized bilaterally by the image inversion processing unit. Accordingly, even when the surveillance camera is installed in an inclined position, an inversion tilt angle at which the obtained image is inverted upside down and symmetrized bilaterally can be selected from a plurality of inversion tilt angles stored according to the inclination. Consequently, the image displayed on the monitor can be prevented from being inverted and symmetrized when should not be inverted and symmetrized, and the image displayed on the monitor can be prevented from not being inverted and symmetrized when should be inverted and symmetrized.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
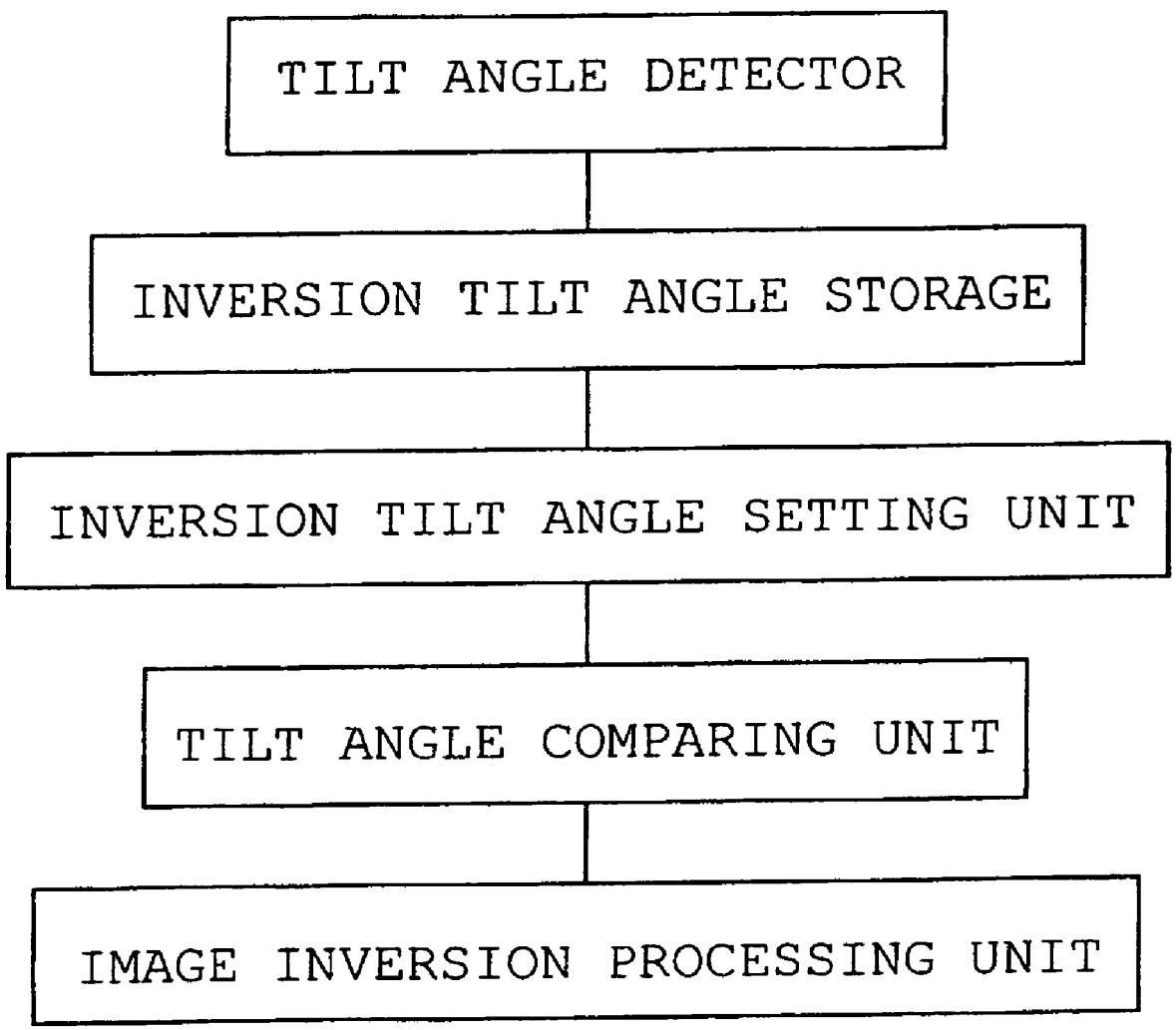
FIG. 1 is a schematic block diagram showing an arrangement of the surveillance camera system of an embodiment in accordance with the present invention.
Figure 2:
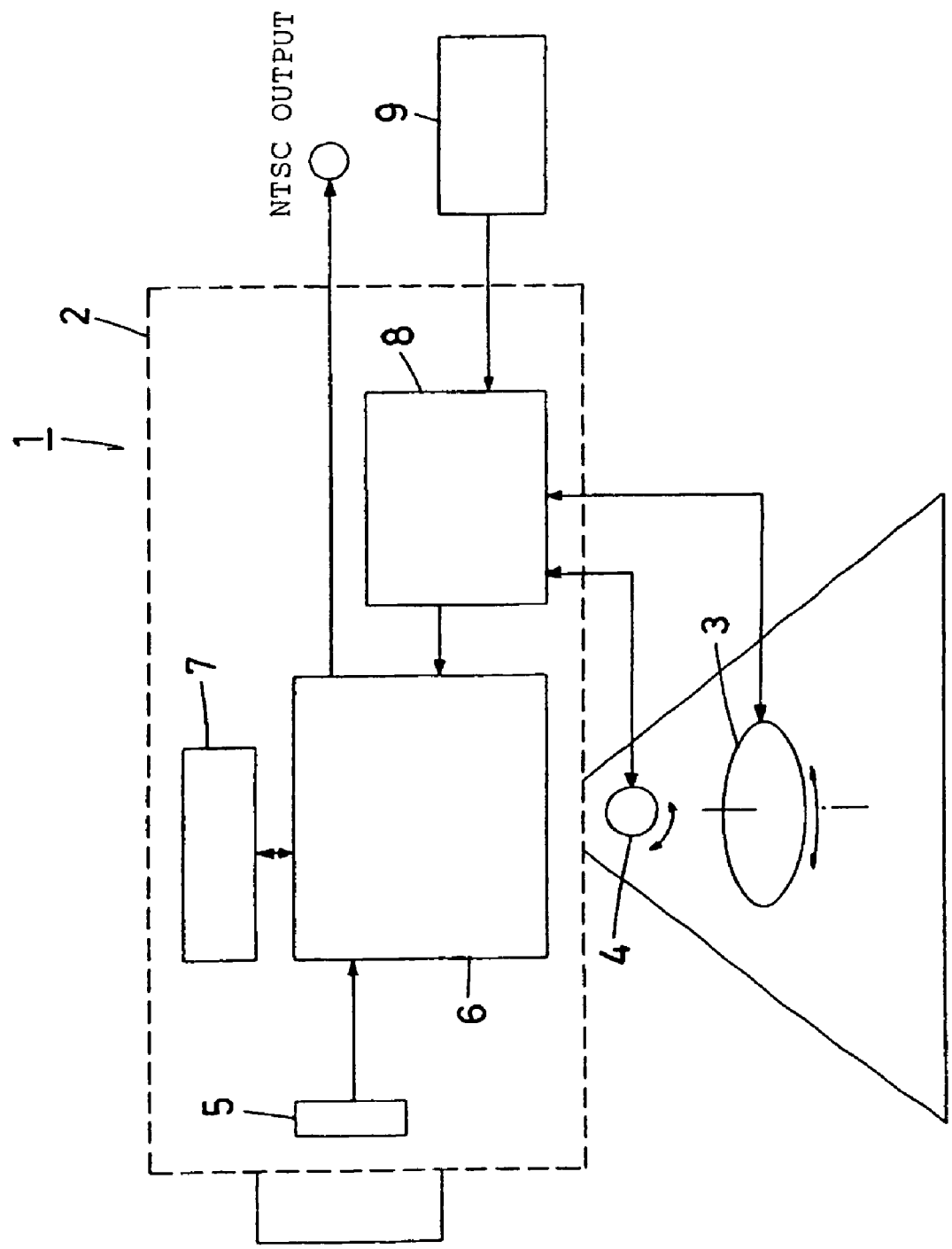
FIG. 2 is also a block diagram showing the arrangement of the surveillance camera system.

One embodiment of the present invention will be described with reference to the accompanying drawings. Referring first to FIG. 2, a schematic arrangement of the surveillance camera system 1 of the embodiment is shown. The surveillance camera system 1 includes a surveillance camera 2, a pan mechanism 3 including a stepping motor (not shown) for panning the surveillance camera 2 and a tilt mechanism 4 also including a stepping motor (not shown) for tilting the surveillance camera 2. The surveillance camera 2 can be rotated 360 degrees in a panning direction by the pan mechanism 3, whereas the surveillance camera 2 can be rotated in the range from −15 to 195 degrees in a tilting direction by the tilt mechanism 4. The surveillance camera 2 includes a charge coupled device (CCD) 5 serving as an image pick-up device, an image processing chip 6, an image memory 7 and a microcomputer 8. Image signals delivered from the CCD 5 is supplied to the image processing chip 6 for image processing. Data of the processed image is stored on the image memory 7 and also converted to a composite video signal such as national television system committee (NTSC), whereby the pickup image is displayed on a monitor (not shown).

The microcomputer 8 carries out a control program installed therein to control the surveillance camera 2. A remote controller 9 supplies a pan/tilt command to the microcomputer 8. Based on the supplied pan/tilt command, the microcomputer 8 supplies control signals for the pan and tilt mechanisms 3 and 4. The microcomputer 8 further detects a pan angle and a tilt angle both relative to a reference position based on a step angle of the stepping motor, thereby seizing a current position of the surveillance camera 2. Furthermore, the microcomputer 8 supplies an image processing control signal to the image processing chip 6 to control write and read of image signals onto and from the image memory 7.

Furthermore, the microcomputer 8 previously stores internal data of an inversion tilt angle which is used to display an image inverted upside down and symmetrized bilaterally. For example, when a horizontal position is 0 degrees, the inversion tilt angle ranges from 60 degrees to 140 degrees at intervals of 10 degrees. A suitable inversion tilt angle is selected from the aforesaid range and set by the remote controller 9.

The microcomputer 8 operates the remote controller 9 so that the surveillance camera 2 is tilted, thereby detecting a tilt angle. The microcomputer 8 then compares the detected tilt angle with the set inversion tilt angle. When determining that the detected tilt angle is equal to or larger than the inversion tilt angle as the result of comparison, the microcomputer 8 supplies an image inversion processing signal to the image processing chip 6. Based on the supplied image inversion processing signal, the image processing chip 6 changes a manner of reading an image signal from the image memory 7, so that an image inverted upside down and symmetrized bilaterally is displayed on the monitor. When the surveillance camera 2 is rotated such that the tilt angle is smaller than the inversion tilt angle, an image obtained by the surveillance camera 2 is displayed without being inverted upside down and symmetrized bilaterally.

According to the foregoing embodiment, even when the surveillance camera 2 is installed in an inclined state, the inversion tilt angle at which the obtained image is inverted upside down and symmetrized bilaterally can be set at any value ranging from 60 degrees to 140 degrees at intervals of 10 degrees when a horizontal position is 0 degrees. Consequently, the image displayed on the monitor can be prevented from being inverted and symmetrized when should not be inverted and symmetrized, and the image displayed on the monitor can be prevented from not being inverted and symmetrized when should be inverted and symmetrized.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A surveillance camera system in which an image obtained by a surveillance camera controlled to be panned/tilted is displayed on a monitor and inverted upside down and symmetrized bilaterally when a tilt angle is equal to or larger than a predetermined inversion tilt angle relative to a reference position, the system comprising:

a tilt angle detector which detects a tilt angle of the surveillance camera;

an inversion tilt angle storage which stores data of a plurality of the predetermined inversion tilt angles;

an inversion tilt angle setting unit which selects and sets either or any one of the inversion tilt angles stored on the inversion tilt angle storage;

a tilt angle comparing unit which compares the tilt angle detected by the tilt angle detector with the inversion tilt angle set by the inversion tilt angle setting unit; and an image inversion processing unit which carries out a process of inverting the image obtained by the surveillance camera upside down and symmetrizing the image bilaterally when the tilt angle is equal to or larger than the inversion tilt angle as a result of comparison by the tilt angle comparing unit.

* * * * *